(12) United States Patent
Kataoka

(10) Patent No.: US 6,947,165 B1
(45) Date of Patent: Sep. 20, 2005

(54) COMMUNICATION TERMINAL DEVICE

(75) Inventor: Naoto Kataoka, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 912 days.

(21) Appl. No.: 09/684,846

(22) Filed: Oct. 6, 2000

(30) Foreign Application Priority Data

Oct. 8, 1999 (JP) ................................. 11-288165

(51) Int. Cl.$^7$ .......................... G06F 15/00; H04N 1/40
(52) U.S. Cl. .................. 358/1.16; 358/1.16; 358/1.14; 358/442
(58) Field of Search .............................. 358/1.14, 437, 358/1.15, 404, 442, 444, 468, 448, 1.16

(56) References Cited

U.S. PATENT DOCUMENTS

| | | | | |
|---|---|---|---|---|
| 5,754,745 A | * | 5/1998 | Sato ........................... | 358/1.14 |
| 6,064,490 A | * | 5/2000 | Minamizawa ............... | 358/1.14 |
| 6,130,757 A | * | 10/2000 | Yoshida et al. ............. | 358/1.15 |
| 6,281,989 B1 | * | 8/2001 | Tomida ....................... | 358/442 |
| 6,373,582 B1 | * | 4/2002 | Asai ........................... | 358/1.13 |
| 6,421,135 B1 | * | 7/2002 | Fresk et al. ................. | 358/1.15 |

FOREIGN PATENT DOCUMENTS

JP          10-308834          11/1998

* cited by examiner

Primary Examiner—Kimberly Williams
Assistant Examiner—Saeid Ebrahimi
(74) Attorney, Agent, or Firm—Hogan & Hartson, LLP

(57) ABSTRACT

A communication terminal device having an image memory (21) which does not overflow even if it accepts data during an interrupted condition. When an interruption key (14) on an operation panel (13) is pressed, the communication terminal device enters an interrupt condition. During the interrupt condition, the device receives data through its NCU (19) and modem (20) and stores it in the image memory. If a user inputs no instructions to the device from the operation panel (13) for a predetermined period during the interrupt condition, a printer (16) is caused to print the image stored in the image memory (21). Thus, the image memory has a room for newly coming data, and does not overflow. If the interrupt process needs to use the printer (16), the printing by the printer is stopped, and the interrupt process is given priority.

13 Claims, 2 Drawing Sheets

COMMUNICATION TERMINAL DEVICE

BACKGROUND OF THE INVENTION

1. Field of the Invention

The present invention relates to a communication terminal device having an interruption function.

2. Description of the Related Art

Many conventional photocopiers have an interruption function. For example, if a user of a photocopier wishes to make a copy while a large amount of another copy is proceeding, he or she uses an interruption function. After having a copy, the user resets the interruption to restart the copying process interrupted.

In recent years, communication terminal devices such as facsimile machines are often equipped with a copying function. The copying function is usually made available by a scanner and recorder (printer), which are originally installed in the facsimile machine. Some of the facsimiles machine also have a printing function for printing data sent from an external computer or the like.

Like the photocopiers, some of these high performance communication terminal devices are also equipped with an interruption function. In the communication terminal devices, if its communication module is not in use during the interruption, facsimile data reception can be performed and data reception from an external computer can also be conducted. Therefore, the communication terminal devices can receive facsimile data (image data) while a user is making a copy utilizing the interruption.

If the interruption is instructed to the machine, the recording (printing) process and scanning (reading) process are stopped and the machine enters the interrupt condition. This condition continues until a cancellation command is input to the machine. Therefore, data from remote facsimiles and computers is successively stored in a memory of the machine during the interruption, and it may overflow.

SUMMARY OF THE INVENTION

An object of the present invention is to provide a communication terminal device that reduces possibility of overflow of data from an associated image memory during interruption.

According to one aspect of the present invention, there is provided a communication terminal device including a printer for printing an image, an image memory for storing the image to be printed by the printer, an operation panel for inputting various instructions including interruption, and a controller for causing the printer to print the image stored in the image memory, with an interruption condition being maintained, if no instructions are input from the operation panel for a prescribed period after the interruption is instructed from the operation panel.

According to a second aspect of the present invention, there is provided a communication terminal device including a printer for printing an image, an image memory for storing the image to be printed by the printer, an operation panel for inputting various instructions including interruption, and a controller for causing the printer to print the image stored in the image memory, with an interruption condition being maintained, if printing is not performed by the printer for a prescribed period after the interruption is instructed from the operation panel.

In both of these aspects of the invention, the printer can output the image from the image memory during the interrupt condition if a user inputs no command to the communication terminal device from the operation panel for the prescribed period after he or she presses an interrupt key to bring the communication terminal device into the interrupt condition, or the printer does not print anything for the predetermined period after the user presses the interrupt key. In this manner, image and data received from a remote facsimile and computer and stored in the image memory during the interrupt condition can be output from the image memory to the printer after a while. As a consequence, it is possible to prevent the image memory from becoming full during the interrupt condition. The communication terminal device can therefore accept new image and data from a remote party even if the device is in the interrupt condition. Since the printing is performed when the user does not touch any key or button on the operation panel for the predetermined period or the printer does not print anything for the predetermined period, it affects the interruption process little.

If the interruption process needs to use the printer while the printer is printing the image stored in the memory during the interrupt condition, the controller stops the printing of the image from the memory and concedes priority to the interruption process.

Outputting of the image to the printer from the image memory may be executed only when a vacant area in the memory becomes less than a predetermined value.

DETAILED DESCRIPTION OF THE INVENTION

An embodiment of the present invention will now be described with reference to the accompanying drawings.

Figure 1:
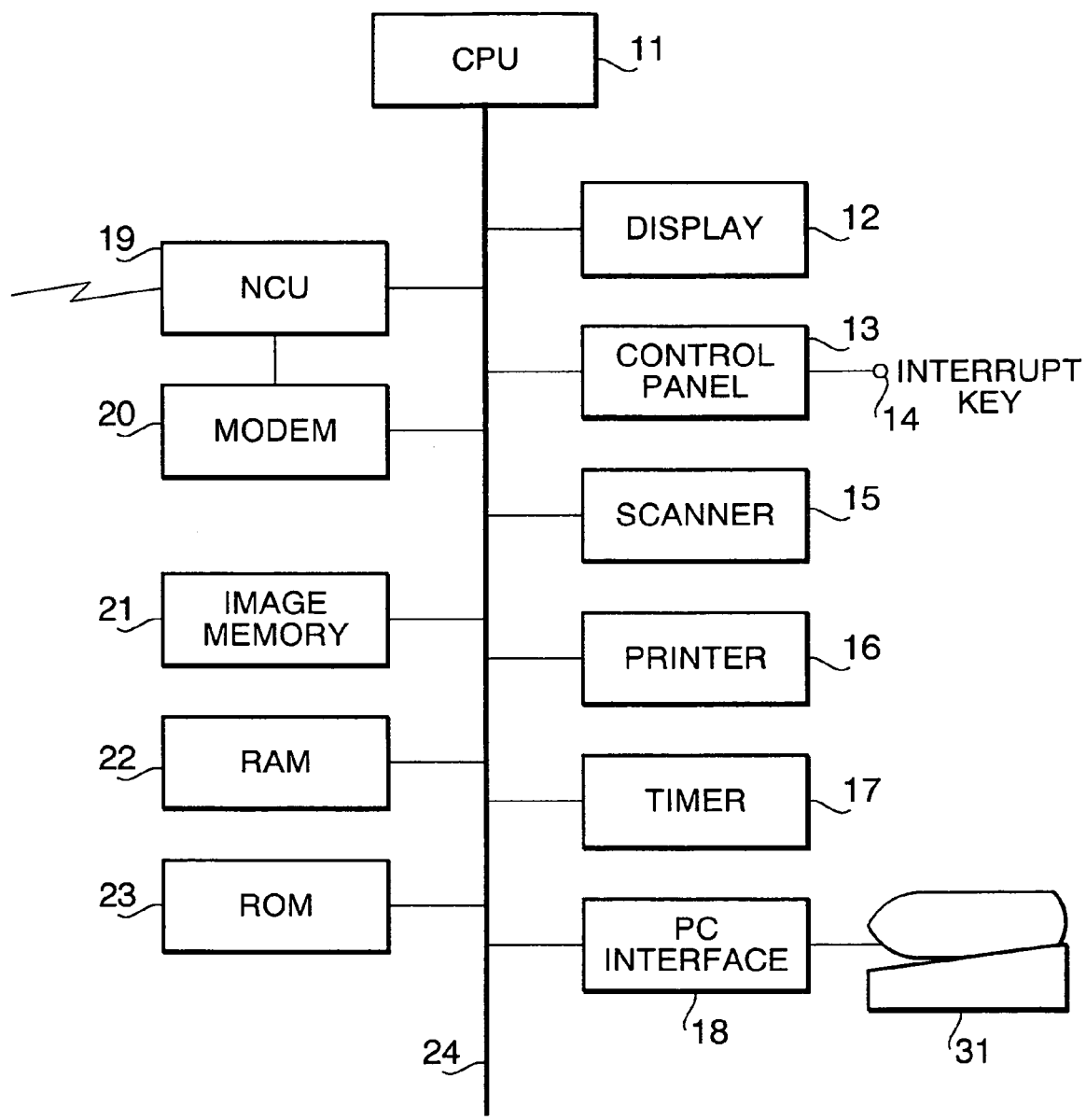
FIG. 1 is a block diagram schematically showing a structure of communication terminal device according to the present invention.

Referring to FIG. 1, illustrated is a communication terminal device of the invention that includes a main controller (CPU) 11, display 12, operation unit (control panel) 13, scanner (reader) 15, recorder (printer) 16, timer 17, PC interface 18, NCU 19, modem 20, image memory 21, RAM 22 and ROM 23. These hardware elements are connected to each other by a bus 24. NCU 19 is also connected to the modem 20 directly. An interruption key 14 is associated with the operation unit 13. Reference numeral 31 designates a computer.

The main controller 11 controls the entire system. In particular, it causes necessary elements to operate when sending and receiving image and making a copy. For image data transmission, the image scanned by the scanner 15 is sent to a recipient via the modem 20 and NCU 19 under the control of main controller 11. For image data reception, the image from a remote party is received at NCU 19 and modem 20 and output from the printer 16. The image received may be stored in the image memory 21 temporarily. For copying, the image scanned by the scanner 15 is printed from the recorder 16.

If the main controller 11 receives a command of interruption from the control panel 13, it stops all the functions except for data transmission and reception via NCU 19 and modem 20 as well as data transmission and reception to and from the computer 31 via the PC interface 18, and the machine enters the interrupt condition. During the interruption, possible are copying, image data transmission (if the transmission is already ongoing, only the scanning is effected), printing of image stored in the image memory and administrative information, various setting and the like. If no instructions are given to the machine during the interruption for a predetermined period, the interrupt condition is maintained, and printable image and data such as image data stored in the image memory 21, data supplied from the computer 31 and image scanned for copying is printed from the printer 16. It should be noted that printing of printable data and image may be executed if no printing takes place in the printer 16 for a predetermined period. Further, a vacant space in the image memory 21 may be monitored, and if it becomes less than a predetermined amount, then printing of printable data and image may be started. The predetermined period may be counted by the timer 17. It should also be noted that the printing during the interruption may be limited to the image received. If the user wishes to utilize the printer in the interruption process, other printing which may be taking place at that time will be stopped, and priority may be given to the interruption process.

The display 12 can visually indicate various information such as messages to the user, messages indicative of machine condition and operational guidance. The operation unit 13 is utilized by the machine operator to perform setting and instruct certain jobs. For instance, the operation unit 13 includes a selection key for making a selection between data transmission and copy, and a start key for causing the selected function to start. In particular, the operation unit 13 in the illustrated embodiment has the interruption key 14 to instruct interruption while other functions being executed. If the user presses this interruption key 14, the machine is brought into the interrupt condition. In order to return to the normal condition, the user presses the interruption key 14 again. It should be noted that the machine can be configured such that entry into the interrupt condition and recovery therefrom may take place by operating other keys or switches. For example, a separate interrupt cancellation key may be provided. Further, the user is able to enter and set other jobs, instructions, data and information.

The scanner 15 scans image on a document for transmission or copying under the control of main controller 11. The scanner 15 may be an image scanner, digital camera or other image reader. The printer 16 prints image received from a remote party or scanned by the scanner 15 on a recording sheet under the control of CPU 11. An electrophotographic printing or ink jet printing is employed.

The timer 17 counts the time. If a predetermined period is set, the timer 17 can make an alarm. Alternatively, the timer 17 may be used as an ordinary clock. In this embodiment, the timer 17 is utilized to detect whether no job is instructed to the machine by the user for a predetermined period in the interrupt condition, and whether no printing is performed by the printer 16 for a predetermined period.

The PC interface 18 is connected to the external computer 31, for example, such that it receives data from the computer 31. The data may be printed from the printer 16 or further sent to a remote machine via the modem 20 and NCU 19. The data may temporarily be stored in the image memory 21. With the PC interface 18, it is also possible that data received from a remote party is transferred to the computer 31 and data scanned by the scanner 15 is transmitted to the computer 31. It should be noted that the PC interface 18 may have an arbitrary configuration to conform with the environment, structure and function of the computer 31. For instance, the PC interface 18 may be a LAN interface. In such case, a plurality of computers 31 may be connected to LAN, and LAN is connected to the interface 18. Of course, a single computer 31 may be coupled to the bus 24 via another type of interface.

NCU 19 controls the line and network when the machine communicates with a remote machine. The modem 20 modulates and demodulates image data for data reception and transmission.

The image memory 21 stores image data to be transmitted and received, image data scanned by the scanner 15, data supplied from the computer 31 via the PC interface 18, and other image and data processed in the machine. Data may be compressed when stored in the image memory.

RAM 22 is employed to store data when CPU 11 and other hardware elements want to keep the data during processing. ROM 23 stores fixed data such as programs needed for CPU 11 to operate.

The bus 24 connects the illustrated hardware elements of the machine and enables data exchange between them. Other hardware elements such as external memory may also be connected to the bus 24.

Now, an operation of the machine will be described. Data transmission and reception through NCU 19 and modem 20, data scanning by the scanner 15, printing by the printer 16, and data input and output from and to the computer 31 via the PC interface 18 are executable in parallel. For example, copying, which includes document scanning and printing, is possible while data is being transmitted or received, or while data is being input from or output to the computer 31. Image transmission and reception, copying and printing are executable by combining available functions of the machine.

A user can also instruct a certain job to the machine by inputting a particular command using the control panel 13 while other processing is being performed. For instance, if a user presses the interrupt key 14, the machine is brought into the interrupt condition. Upon pressing of the interrupt key 14 during scanning, the scanning is interrupted after the scanner finishes scanning that page of a document which is in the middle of scanning at the time the key is pressed. When the interrupt key 14 is pressed during printing, the printing is stopped after the printer finishes printing on that recording sheet which is in the middle of printing at the time the key is pressed. If the interrupt key is pressed during data transmission, the data transmission is allowed to continue until the end of transmission, in order to avoid occurrence of transmission error. It should be noted that the interruption process is executable while the data transmission is proceeding after the interrupt key is pressed.

Data reception from a remote party and data input from the computer 31 are allowed to continue even after the machine is brought into the interrupt condition. Therefore, the image data received during the interrupt condition and data received from the computer 31 during the interrupt condition are accumulated in the image memory 21. If the interrupt condition lasts long, the image memory 21 would eventually become full and the data would overflow. To avoid such overflow in the present invention, printable data stored in the image memory 21 is output from the memory to the printer at an appropriate timing so that the image memory 21 does not become full.

Figure 2:
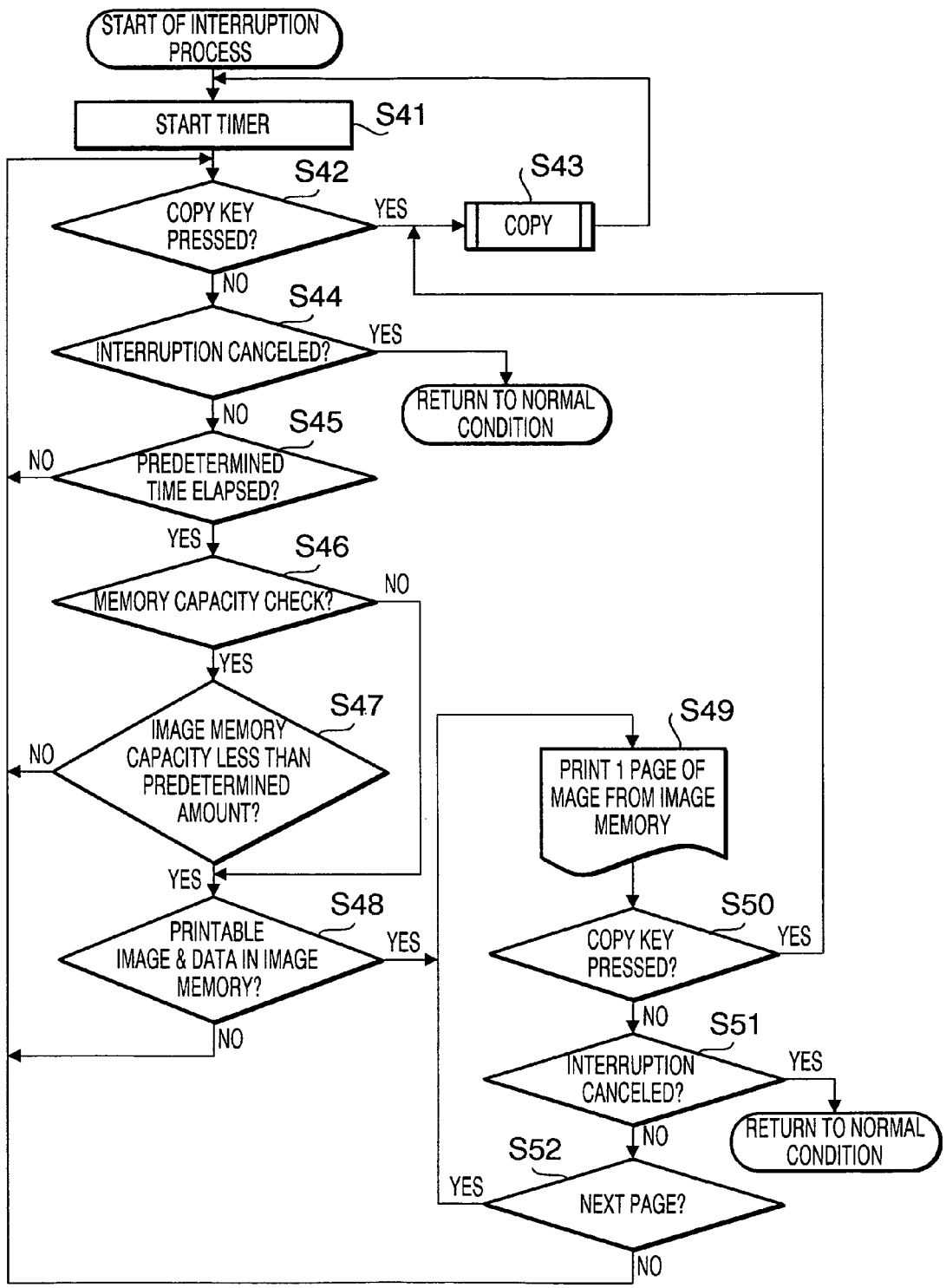
FIG. 2 is a flowchart illustrating one example of operation of the communication terminal shown in FIG. 1 during the interrupt condition.

Referring to FIG. 2, illustrated is an operation during the interrupted condition according to the present invention. As the user presses the interrupt key 14, the ongoing scanning and printing are interrupted. This is the start of the interrupt process. The following description deals with a case where a user makes a copy in the interrupt process.

At S41, the timer 17 is activated to count a predetermined period. At S42, it is determined whether a user has pressed a copy key. If yes, the machine makes a copy at S43. Specifically, image data on a document is scanned by the scanner 15, and the scanned image is printed on a recording sheet by the printer 16. Of course, various parameters may be set at the time of copying. For example, enlargement/reduction may be set.

When the copying is complete, the program returns to S41 and the timer is reset so that time counting is resumed after copying.

If the copy key is not pressed at S42, then it is determined whether the interrupt condition is canceled at S44. If yes, the interrupt process is terminated and the machine returns to the initial (or normal) condition. If the interrupt condition is not canceled, the program proceeds to S45 to determine whether a predetermined period has elapsed after activation of the timer 17. If the answer is no, the program returns to S42. In other words, whether the copy key is pressed or not, and whether the interrupt process is terminated or not are monitored for the predetermined period. If the copy key is pressed during such period, the scanner and printer are driven to make a copy, and the timer 17 is reset again.

If the copy button is not pressed and interrupt condition is not canceled during the predetermined period, printable image and data in the image memory 21 is output to the printer and printed on a recording sheet. First, however, it is determined at S46 whether printing based on the remaining capacity of the image memory 21 should be executed or not in this particular embodiment. A user may set such printing beforehand. If the answer is yes at S46, then it is determined whether the remaining capacity of the image memory 21 is less than a prescribed value at S47. The prescribed value may be 50%. If the vacant space in the memory is greater than the prescribed value, the program returns to S42 since it is considered that there is sufficient room left. In this case, the image and data are not discharged from the image memory 21. In the routine from S42 to S47, determination at S45 is skipped over since the predetermined period has already elapsed. In the meantime, data is received from a remote party and input from the computer 31, and accumulated in the image memory 21. Eventually, the image memory 21 has a vacant space less than the predetermined volume. If the answer becomes yes at S47, the program advances to S48.

If a user does not want to have printing based on the remaining capacity of the image memory 21 (No at S46), the printing automatically takes place as long as printable image and data is present in the image memory 21 (S48) in this embodiment.

At S48, it is determined whether printable image and data exist in the image memory 21. For example, image (facsimile data) received from a remote facsimile machine and data input from the external computer 31 are the printable image and data. Likewise, image scanned by the scanner 15 during the copying operation and stored in the image memory 21 is the printable image. This image may include those which are in the printing process at the time the machine enters the interrupt condition, and those which are waiting in the image memory for being printed since another printing process is proceeding. If there is such image and data in the image memory 21, one page worth of image/data is printed from the printer 16. Then, it is determined whether the copy key is pressed at S50. If not, it is subsequently determined whether the interrupt cancellation key is pressed at S51. If the answer is no, it is determined whether there is a next page to be printed at S52. When another page worth of image/data is remains in the image memory 21, the program returns to S49 and causes the printer to print it.

As described above, the instruction of copy and cancellation of interrupt process are monitored while the printable image and data is being printed one page at a time. If there is no printable image or data in the image memory 21, the program returns to S42. When the copy is instructed to the machine during the interrupt condition, it is detected at S50 and the program goes to S43. If the interrupt cancellation is instructed, it is detected at S51 and the interruption process is terminated. Then, processing which is stopped upon interruption is restarted.

If there is no printable image or data in the image memory 21 at S48, the printing process of S49 to S52 is not executed. Instead, the program returns to S42. Image which is set to be transmitted to a particular recipient at a particular time is of course not the "printable image" at S48 even though it is stored in the image memory 21. Likewise, image stored in the image memory 21 in the interrupt process is not the "printable image" at S48. Further, the "printable image and data" at S48 may be limited to particular image by excluding, for example, the data input from the computer 31.

In this manner, generally, printable image and data stored in the image memory 21 is printed if the copy key is not pressed for a predetermined period in the interrupt condition. Consequently, the image memory 21 can have sufficient vacant area to store newly coming data, and the data overflow or "memory full" is prevented.

It should be noted that determination at S46 may be dispensed with. In this configuration, the remaining memory capacity is always monitored or not monitored at all.

Although the foregoing has dealt with the case where the copying is instructed by a user in the interrupt process, the present invention is also applicable to, for example, a case where data transmission is instructed in the interrupt process, and a case where printing is instructed during the interrupt process. In such cases, determination at S42 and S50 for determining whether a user wants to make a copy may be replaced by "whether data transmission is desired" and "printing is desired."

In the illustrated embodiment, the time until the user inputs the copy command is counted, and printable image and data are printed after the predetermined period elapses. However, the printing may be performed unless the job input by the user in the interrupt process uses the printer 16. For example, if the user utilizes the interrupt function to send data to a remote party, the scanner 15, NCU 19 and modem 20 are activated for this data transmission, but the printer 16 is not used for the data transmission. Thus, the printer can print image and data if any. It should also be noted that the timer 17 may count the time after the printer 16 is last used. In this case, the determination at S46 will be made when the predetermined period counted in the above manner passes. It should be further noted that the determination at S50 may be replaced by "whether the printer 16 is used in the interruption process", i.e., whether the user presses the interruption key to do something using the printer 16. If the printer 16 is not used in the interruption process, data printing may also be executed while such interruption process is being executed.

It should also be noted that the PC interface 18 may be dispensed with in the configuration shown in FIG. 1.

The above described and illustrated communication terminal device is disclosed in Japanese Patent Application No. 11-288165 filed in JPO on Oct. 8, 1999, and the subject application claims the priority of this Japanese Patent Application, the entire disclosure of which is incorporated herein by reference.

What is claimed is:

1. A communication terminal device comprising:
   a printer for printing an image;
   an image memory for storing the image to be printed by the printer;
   an operation unit for inputting various instructions including interruption; and
   a controller for causing the printer to print the image stored in the image memory, with an interruption condition being maintained, if no instructions are input from the operation panel for a prescribed period after the interruption is instructed from the operation panel, wherein the controller causes the printer to print the image stored in the image memory if a vacant area in the image memory is less than a predetermined value.

2. A communication terminal device comprising:
   a printer for printing an image;
   an image memory for storing the image to be printed by the printer;
   an operation panel for inputting various instructions including interruption; and
   a controller for causing the printer to print the image stored in the image memory, with an interruption condition being maintained, if printing is not performed by the printer for a prescribed period after the interruption is instructed from the operation panel, wherein the controller causes the printer to print the image stored in the image memory if a vacant area in the image memory is less than a predetermined value.

3. The communication terminal device of claim 1, wherein the controller interrupts printing by the printer if an interruption process needs to use the printer, and then causes the printer to print according to the interruption process.

4. The communication terminal device of claim 2, wherein the controller interrupts printing by the printer if an interruption process needs to use the printer, and then causes the printer to print according to the interruption process.

5. The communication terminal device of claim 1, wherein the image stored in the image memory is a facsimile image received from a remote party.

6. The communication terminal device of claim 2, wherein the image stored in the image memory is a facsimile image received from a remote party.

7. The communication terminal device of claim 3, wherein the image stored in the image memory is a facsimile image received from a remote party.

8. The communication terminal device of claim 4, wherein the image stored in the image memory is a facsimile image received from a remote party.

9. The communication terminal device of claim 1, wherein the image stored in the image memory is data received from a remote computer.

10. The communication terminal device of claim 2, wherein the image stored in the image memory is data received from a remote computer.

11. The communication terminal device of claim 3, wherein the image stored in the image memory is data received from a remote computer.

12. The communication terminal device of claim 4, wherein the image stored in the image memory is data received from a remote computer.

13. A method comprising the steps of:
    A) starting an interrupt condition;
    B) determining whether a predetermined period elapses; and
    C) printing an image stored in a memory while maintaining the interrupt condition unless prescribed instructions are input for the predetermined period,
    wherein the step C is executed only when a remaining capacity of the memory is less than a predetermined value.

* * * * *